United States Patent [19]

Liechti et al.

[11] 3,901,883
[45] Aug. 26, 1975

[54] AZOLE COMPOUNDS
[75] Inventors: Peter Liechti, Arisdorf; Hans Schläpfer, Basel, both of Switzerland
[73] Assignee: Ciba-Geigy AG, Basel, Switzerland
[22] Filed: Mar. 1, 1973
[21] Appl. No.: 337,026

[30] Foreign Application Priority Data
Mar. 8, 1972 Switzerland.................. 3366/72

[52] U.S. Cl............... 260/240 D; 96/1 R; 106/124; 106/148; 106/176; 117/33.5 T; 117/33.5 R; 117/139.4; 117/139.5 R; 252/152; 252/301.2 W; 252/543; 260/37 NP; 260/37 R; 260/40 P; 260/307 D; 260/308 A; 260/309.2; 260/515 R; 260/558 A; 260/559 S
[51] Int. Cl............................. C09b 23/14
[58] Field of Search................. 260/240 D

[56] References Cited
UNITED STATES PATENTS
3,725,395   4/1973   Siegrist et al................. 260/240 CA
FOREIGN PATENTS OR APPLICATIONS
1,273,478   5/1972   United Kingdom............ 260/240 C
751,417    11/1970   Belgium Primary Examiner—John D. Randolph
Attorney, Agent, or Firm—Joseph G. Kolodny; Edward McC. Roberts; Prabodh I. Almaula

[57] ABSTRACT
New azole compounds of the formula

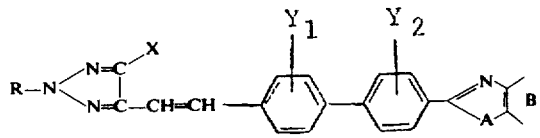

and quaternisation products of the imidazole compounds of the formula

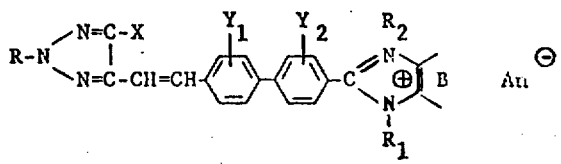

wherein R denotes optionally non-chromophorically substituted phenyl, naphthyl or diphenylyl, X denotes hydrogen, halogen, alkyl or optionally non-chromophorically substituted phenyl, naphthyl or diphenylyl, $Y_1$ and $Y_2$ independently of one another denote hydrogen, halogen, alkyl with one to four carbon atoms or alkoxy with one to four carbon atoms, B denotes a benzene or naphthalene radical which is condensed with the azole ring and is optionally non-chromophorically substituted, A denotes oxygen or an imino group, $R_1$ denotes optionally substituted alkyl, alkenyl, cycloalkyl, aralkyl or aryl, $R_2$ denotes optionally substituted alkyl, alkenyl, cycloalkyl or aralkyl and $An^-$ denotes an anion. These compounds are particularly useful as optical brighteners.

8 Claims, No Drawings

AZOLE COMPOUNDS

The present invention relates to new azole compounds, processes for the manufacture of these compounds and their use as optical brighteners for organic materials.

The azole compounds according to the present invention are the compounds of the formula

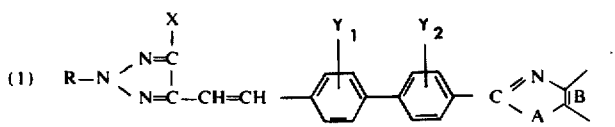

and quaternisation products of the imidazole compounds of the formula

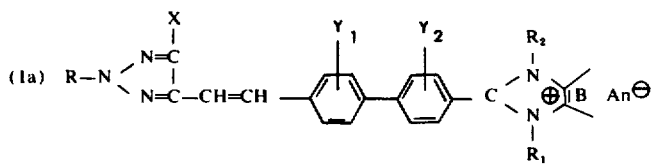

wherein R denotes optionally non-chromophorically substituted phenyl, naphthyl or diphenylyl, X denotes hydrogen, halogen, alkyl or optionally non-chromophorically substituted phenyl, naphthyl or diphenylyl, $Y_1$ and $Y_2$ independently of one another denote hydrogen, halogen, alkyl with one to four carbon atoms or alkoxy with one to four carbon atoms, B denotes a benzene or naphthalene radical which is condensed with the azole ring and is optionally non-chromophorically substituted, A denotes oxygen or an imino group, $R_1$ denotes optionally substituted alkyl, alkenyl, cycloalkyl, aralkyl or aryl, $R_2$ denotes optionally substituted alkyl, alkenyl, cycloalkyl or aralkyl and $An^\ominus$ denotes an anion.

If A in the formula (1) denotes oxygen, the new compounds are oxazole compounds. On the other hand, if A denotes an imino group, they are imidazole compounds. As an imino group, A advantageously represents a group $N-R_1$
wherein $R_1$ has the meaning indicated under the formula (1a). The benzene or naphthalene ring B of the compounds of the formula (1) is condensed with the azole ring in the manner indicated by the valency lines, that is to say two carbon atoms are simultaneously ring members of the aromatic ring and of the heterocyclic ring. Further non-chromophoric substituents can be present in the radical B. As such substituents, there are to be understood both monovalent and divalent radicals, and the latter can form a carbocyclic or heterocyclic ring fused to the benzene or naphthalene ring.

Possible substituents of the phenyl, naphthyl or diphenylyl radicals in the definitions of R and X are above all halogen, preferably chlorine, alkyl with 1 to 4 carbon atoms, alkenyloxy with 3 or 4 carbon atoms, optionally substituted alkoxy, preferably with 1 to 12 carbon atoms, optionally substituted benzyloxy, the sulpho group or its salts, the

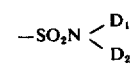

grouping, wherein $D_1$ and $D_2$ independently of one another represent hydrogen or alkyl with one to four carbon atoms or $D_1$ and $D_2$ together with the nitrogen atom represent optionally methyl-substituted piperidino or morpholino or pyrrolidino or hexamethyleneimino, the groups $SO_2-D_3$ or $SO_2OD_3$, wherein $D_3$ represents alkyl with one to four carbon atoms or optionally substituted phenyl, the nitrile or carboxyl group as well as its salts, esters or amides. As substituents of the alkoxy radical, halogen, hydroxyl, alkoxy with one to four carbon atoms, nitrile, the sulphonic acid or carboxylic acid group or their salts, esters and amides should particularly be mentioned and as substituents of the benzyloxy radical alkyl or alkoxy with one to four carbon atoms or halogen, preferably chlorine, should especially be mentioned. The number of the substituents on a phenyl, naphthyl or diphenylyl radical in general does not exceed two. Amongst the series phenyl, naphthyl and diphenyl, phenyl is preferred.

The sulphonic acid groups and carboxyl groups present in the salt form are mostly their alkali metal, alkaline earth metal, ammonium or amine salts. The sodium and potassium salts are preferred.

The formula (1) or (1a) for example encompasses the compounds of the formula

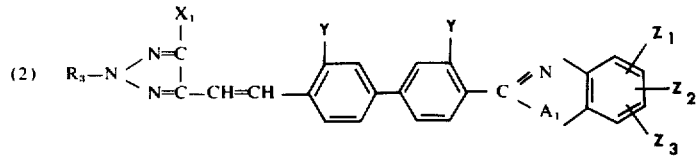

wherein $R_3$ represents a phenyl group which can optionally be substituted by sulpho groups or their salts, halogen, alkyl with one to four carbon atoms, alkenyloxy with three or four carbon atoms, phenyl, alkoxy with one to eight carbon atoms or benzyloxy, $X_1$ represents hydrogen, halogen, alkyl with one to four carbon atoms or phenyl which is optionally substituted by halogen, alkyl with one to four carbon atoms or alkoxy with one to four carbon atoms or the sulpho group or its salts, Y represents hydrogen, halogen, alkyl with one to four carbon atoms or alkoxy with one to four carbon atoms, $Z_1$ and $Z_2$ independently of one another represent hydrogen, halogen, alkyl with one to 18 carbon atoms which can be substituted by carboxyl, carbalkoxy with two to nine carbon atoms, carbamoyl, carbamoyl substituted at the nitrogen by alkyl possessing one to 12 carbon atoms or by hydroxyalkyl, or nitrile, alkoxy with one to 18 carbon atoms, phenyl or phenoxy optionally substituted by halogen, alkyl with one to four carbon atoms or alkoxy with one to four carbon atoms, alkenyl with three or four carbon atoms, cyclopentyl, cyclohexyl, phenylalkyl or phenylalkoxy with one to four carbon atoms in the alkyl or alkoxy part and optionally ring-substituted by halogen, alkyl with one to four carbon atoms or alkoxy with one to four carbon atoms, carboxyl, carbalkoxy with two to nine carbon atoms, carbamoyl, carbamoyl substituted at the nitrogen by alkyl or hydroxyalkyl with one to 12 carbon atoms, nitrile, alkylsulphonyl or alkoxysulphonyl with one to 12 carbon atoms, phenylsulphonyl or phenoxysulphonyl optionally substituted by halogen, alkyl with one to four carbon atoms or alkoxy with one to four carbon atoms, sulphamoyl, sulphamoyl substituted at the nitrogen by alkyl or hydroxyalkyl with one to 12 carbon atoms, the sulpho group or its salts or $Z_1$ and $Z_2$ in the o-position to one another jointly represent a fused benzene radical, tetramethylene, trimethylene or methylenedioxy, $Z_3$ represents hydrogen, halogen, alkyl with one to four carbon atoms or alkoxy with one to four carbon atoms and $A_1$ represents oxygen or a radical of the formula $>N-R_4$ wherein $R_4$ represents hydrogen, alkyl with one to 12 carbon atoms which can be substituted by hydroxyl, alkoxy with one to four carbon atoms, carboxyl, carbalkoxy with two to five carbon atoms, nitrile, the sulpho group or its salts or alkylsulphonyl with one to four carbon atoms, phenyl which is optionally substituted by halogen, alkyl with one to four carbon atoms or alkoxy with one to four carbon atoms, phenylalkyl, with one to four carbon atoms in the alkyl part, which is optionally ring-substituted by halogen, alkyl with one to four carbon atoms or alkoxy with one to four carbon atoms, or cyclohexyl, and the quaternisation products of the imidazole compounds which correspond to the formula

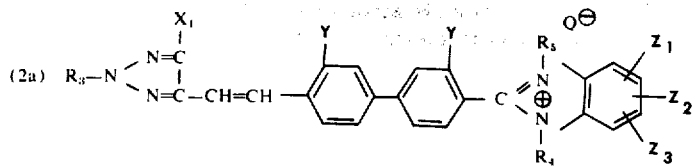

(2a)

in which $R_3$, $R_4$, $X_1$, Y, $Z_1$, $Z_2$ and $Z_3$ have the abovementioned meaning, whilst $R_5$ represents alkyl with one to 12 carbon atoms which is optionally substituted by hydroxyl or alkoxy with one to four carbon atoms, phenylalkyl with one to four carbon atoms in the alkyl part which is optionally ring-substituted by halogen, alkyl with one to four carbon atoms or alkoxy with one to four carbon atoms, or alkyl with one to four carbon atoms which is substituted by nitrile, carbamoyl or carbalkoxy with two to five carbon atoms, and Q represents halogen, an alkylsulphuric acid radical with one to four carbon atoms, an alkanesulphonic acid radical with one to four carbon atoms, an optionally methyl-substituted benzene-sulphonic acid radical or the radical $-SO_4{}^{2-}/2$. In each case, chlorine is the preferred halogen.

Compounds to be particularly singled out are those of the formula (3)

wherein $V_1$ represents hydrogen, the sulphonic acid group or its sodium salt, chlorine, alkyl with one to four carbon atoms or alkoxy with one to four carbon atoms, $V_2$ represents hydrogen, chlorine or alkyl with one to four carbon atoms, $X_2$ represents hydrogen or chlorine, $Z_4$ represents hydrogen, chlorine, alkyl with one to 12 carbon atoms, alkoxy with one to 12 carbon atoms, cyclohexyl, phenylalkyl with one to three carbon atoms in the alkyl part, alkyl with one to four carbon atoms, which is substituted by carbalkoxy with two to five carbon atoms or by carbamoyl which is substituted at the nitrogen with alkyl or hydroxyalkyl with one to four carbon atoms, or phenyl or phenoxy optionally substituted by chlorine, methyl or methoxy, $Z_5$ represents hydrogen, chlorine or alkyl with one to four carbon atoms or $Z_4$ and $Z_5$ in the o-position to one another represent a fused benzene radical or tetramethylene and $A_2$ represents oxygen or a radical of the formula $>N-R_6$ wherein $R_6$ denotes hydrogen, methyl, ethyl, hydroxyethyl, cyanoethyl, benzyl or phenyl, and the quaternisation products of the imidazole compounds which correspond to the formula (3a) 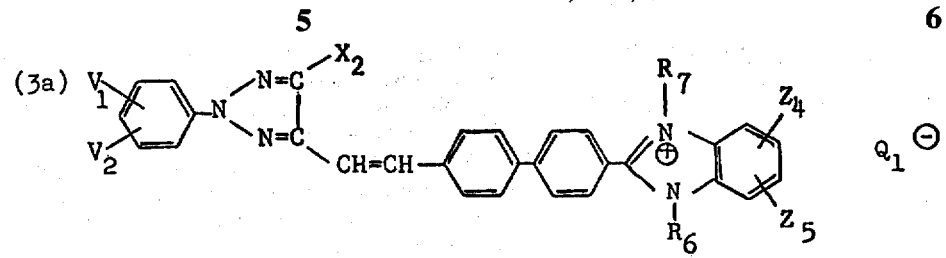

in which $V_1$, $V_2$, $X_2$, $Z_4$, $Z_5$ and $R_6$ have the indicated meaning, whilst $R_7$ represents methyl, ethyl or benzyl and $Q_1$ represents chlorine, bromine, iodine, the methylsulphuric acid radical or the p-toluenesulphonic acid radical.

Amongst the compounds of the formulae (1) to (3) or (1a) to (3a), those in which X, $X_1$ and $X_2$ in each case represent hydrogen are of outstanding interest.

In each case, the oxazoles, that is to say the compounds in which A, $A_1$ or $A_2$ represent oxygen, are preferred. Oxazoles of particular practical interest correspond to the formula (4) 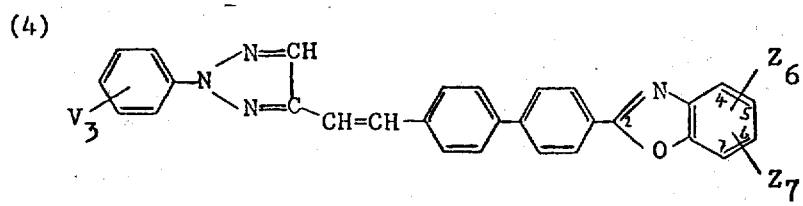

wherein $V_3$ denotes hydrogen, the sulphonic acid group or its sodium salt, chlorine or methyl, $Z_6$ denotes hydrogen, alkyl with one to eight carbon atoms, cyclohexyl, phenylalkyl with one to three carbon atoms in the alkyl part, methylsulphonyl or chlorine, these being in each case in the 5-position, or methoxy, phenoxy or phenyl, these being in each case in the 5-position or 6-position, and $Z_7$ denotes hydrogen or alkyl with one to four carbon atoms present in the 6- or 7-position or $Z_6$ and $Z_7$ together denote a benzene or tetramethylene radical fused in the 4- and 5-position.

Particularly preferred compounds correspond to the formulae (30) and (31) given later.

The compounds of the formula (1) or of subordinate formulae (2), (3) and (4) can be manufactured analogously to processes which are in themselves known.

One such process consists, for example, of reacting about 1 mol equivalent of a compound of the formula (5) 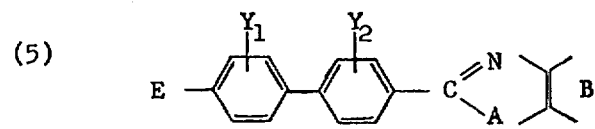

wherein Y, $Y_1$, B and A have the indicated meaning and E denotes a grouping of the formula

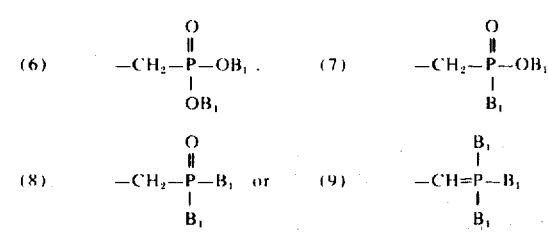

wherein $B_1$ represents an alkyl radical, preferably with one to six carbon atoms, which is optionally substituted further, an aryl radical, preferably a phenyl radical, a cycloalkyl radical, preferably a cyclohexyl radical or an aralkyl radical, preferably a benzyl radical, with a compound of the formula

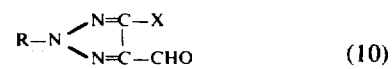 (10)

wherein R and X have the indicated meaning.

The manufacturing process is advantageously carried out in inert solvents. As examples thereof there may be mentioned hydrocarbons, such as toluene and xylene, or alcohols, such as methanol, ethanol, isopropanol, butanol, glycols, glycol ethers such as 2-methoxyethanol, hexanols, cyclohexanol and cyclooctanol, ethers such as diisopropyl ether, tetrahydrofurane and dioxane and also dimethylsulphoxide, formamide and N-methylpyrrolidone. Polar organic solvents such as dimethylformamide and dimethylsulphoxide are particularly suitable. Some of the reactions can also be carried out in aqueous solution.

The temperature at which the reaction is carried out can vary within wide limits. It is determined ($\alpha$) by the resistance of the solvent used towards the reactants, especially towards the strongly basic alkali metal compounds, ($\beta$) by the reactivity of the condensation partners and ($\gamma$) by the activity, as a condensation agent, of the solvent-base combination.

In practice, accordingly, temperatures between about 10° and 100°C are generally used, especially if dimethylformamide or dimethylsulphoxide are used as solvents. The preferred temperature range is 20° to 60°C. However, under certain circumstances higher temperatures can also be used if this is desired for reasons of time saving or if a less active but cheaper condensation agent is to be employed.

In principle, reaction temperatures in the range of 10° to 180°C are thus also possible.

Possible strongly basic alkali metal compounds are above all the hydroxides, amides and alcoholates (preferably those of primary alcohols containing one to four carbon atoms) of the alkali metals, and for economic reasons those of lithium, sodium and potassium are of predominant interest. In principle, and in special cases, it is however also possible successfully to employ alkali metal sulphides and alkali metal carbonates, aryl-alkali metal compounds, such as, for example, phenyllithium, or strongly basic amines (including ammonium bases, for example trialkylammonium hydroxides).

The phosphorus compounds of the formula (5) required as starting substances are obtained in a manner which is in itself known by reacting halogenomethyl compounds, preferably chloromethyl or bromomethyl compounds of the formula

(11) 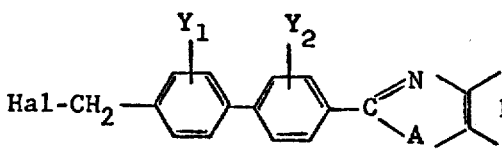

wherein Hal represents chlorine or bromine and $Y_1$, $Y_2$, A and B have the abovementioned meaning, with phosphorus compounds of the formulae

(12)  $B_1O-P(OB_1)-OB_1$   (13)  $B_1O-P(OB_1)-B_1$

(14)  $B_1-P(OB_1)-B_1$  or   (15)  $B_1-P(B_1)-B_1$

In the formulae (12) to (15), $B_1$ has the indicated meaning, with radicals $B_1$ bonded to oxygen preferably being lower alkyl groups whilst radicals $B_1$ bonded directly to phosphorus are preferably aryl radicals such as benzene radicals.

The compounds of the formula (11) are obtained in a known manner from the compounds of the formula

(16) 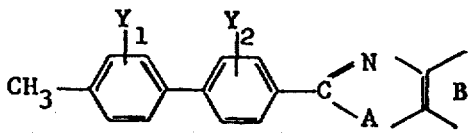

for example by bromination by means of bromosuccinimide or chlorination by means of chlorine, the halogenation being catalysed by light of short wavelengths.

A process for the manufacture of the compounds of the formula (16) consists, for example, of reacting carboxylic acids or carboxylic acid halides of the formula

(17) 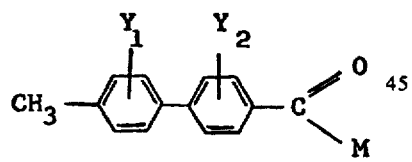

wherein M represents a hydroxyl group, an alkoxy group with one to four carbon atoms or a halogen atom, especially a chlorine atom, and $Y_1$ and $Y_2$ have the abovementioned meaning, with o-amino compounds of the formula

(18) 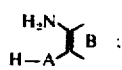

herein, intermediate stages, for examples compounds of the formula

(19) 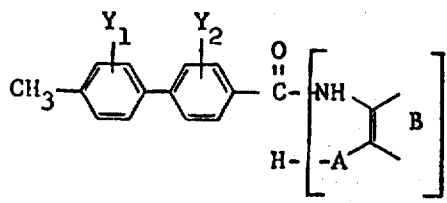

can be isolated if appropriate.

In the formulae (17), (18) and (19) $Y_1$, $Y_2$, A and B have the abovementioned meaning.

The reaction between the particular components of the formulae (17) and (18) can be carried out with or without intermediate isolation of the intermediate stages of the formula (19) first produced, by heating to higher temperatures, for example to 120°–350°C, advantageously in an inert gas, for example a stream of nitrogen, the reaction optionally being carried out in the presence of a catalyst. Examples of suitable catalysts are boric acid, boric anhydride, zinc chloride, p-toluenesulphonic acid, and polyphosphoric acids, including pyrophosphoric acid. If boric acid is used as the catalyst, the latter is advantageously employed in an amount of 0.5 to 5% relative to the total weight of the reaction mixture. It is also possible at the same time to use high-boiling, polar, organic solvents, such as, for example, dimethylformamide, dichlorobenzene, trichlorobenzene and aliphatic optionally etherified hydroxy compounds, for example propylene glycol, ethylene glycol monoethyl ether or diethylene glycol diethyl ether and high-boiling esters of phthalic acid, for example dibutyl phthalate.

If the reaction is carried out in two stages it is possible first to condense the carboxylic acid halides of the formula (17) with the o-amino compound of the formula (18) in the presence of an inert organic solvent such as toluene, xylenes, chlorobenzene, dichlorobenzene, trichlorobenzene or nitrobenzene, at temperatures between 100° and 200°C, and to convert the resulting acyl compounds of the formula (19) into the azole compound of the formula (16) at temperatures between 150° and 350°C, optionally in the presence of a catalyst. If carboxylic acid chlorides are used as the starting substances, these can be manufactured, immediately prior to the condensation with the o-amino compound, from the free carboxylic acid and thionyl chloride, if appropriate with addition of a catalyst, such as pyridine, in the solvent wherein the condensation subsequently takes place.

Compounds of the formula (17) are obtained, for example, by reduction of a compound of the formula

(20) 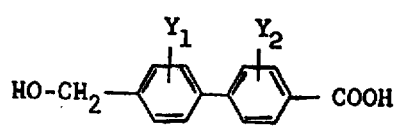

by means of hydrogen/palladium. The compounds of the formula

(21) 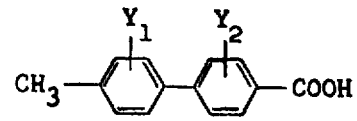

obtained in this manner are thereafter converted, if desired, into the corresponding acid chlorides or esters in accordance with known processes.

The aldehydes of the formula (10) are known or can be manufactured according to known methods.

Another process for the manufacture of compounds of the formula (1) or of the subordinate formula (2) to (4) consists of the reaction of one of the compounds of the formula

(22) 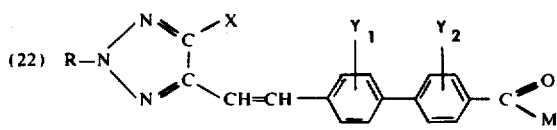

with a compound of the formula (18), wherein R, X, $Y_1$, $Y_2$ and M have the abovementioned meaning; here, the reaction conditions indicated previously for the manufacture of a compound of the formula (16) from compounds of the formulae (17) and (18) can be used.

The compounds of the formula (22) can in turn be manufactured analogously to known processes. For example, a compound of the formula

(23) 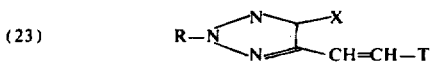

wherein R and X have the indicated meaning and T represents a negative substituent, such as acetyl, carboxyl, nitrile or an optionally substituted carboxylic acid ester group or carboxylic acid amide group, is arylated by means of a diazonium salt of an amine of the formula

(24) 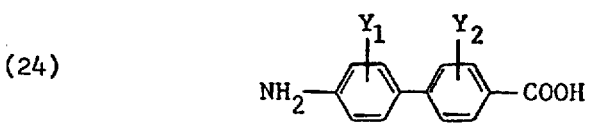

with the substituent T being split off simultaneously or subsequently.

This "Meerwein arylation" is generally carried out in an aqueous or aqueous-organic phase, such as water-acetone, water-methanol, water-ethanol and the like, at temperatures of $-10°$ to $+60°C$, preferably at 20° to 40°C, and in the presence of copper salts, if appropriate in the presence of a buffer which is effective in the acid range, for example acetic acid-sodium acetate, monosodium phosphate, monosodium tartrate and the like.

The compounds of the formula (23) are manufactured in a known manner from the compounds of the formula (10). For example, the compounds of the formula (23) wherein T represents carboxyl are obtained by reaction of a compound of the formula (10) with malonic acid.

Compounds of the formula (22) can also be manufactured by reaction of a compound of the formula (10) with a compound of the formula

(25) 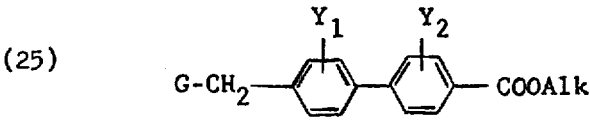

wherein G for example represents carboxyl or $-PO(OAlk)_2$ and Alk represents alkyl with one to four carbon atoms and $Y_1$ and $Y_2$ have the indicated meaning.

Imidazole compounds of the formula (1) or subordinate formulae (2) to (4) can also be manufactured by reacting a compound of the formula (22), preferably an acid chloride, for example with an o-nitroamino compound of the formula

(26) 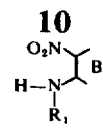

to give a compound of the formula

(27) 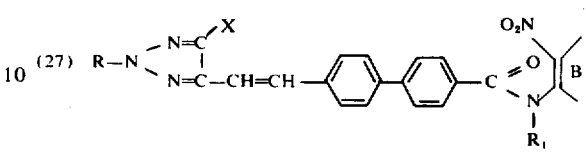

whereupon either the nitro group is reduced in an acid medium, for example with tin chloride/water, with simultaneous cyclisation to give the imidazole, or the nitro group is reduced under conditions which do not bring about the cyclisation of the o-aminoacylamino compound to the imidazole (Béchamp reduction) and the cyclisation is subsequently brought about by acid condensation agents, such as hydrochloric acid.

Quaternised compounds of the formulae (1a), (2a) and (3a) are obtained according to known methods from the compounds of the formulae (1), (2) or (3), in accordance with the equation

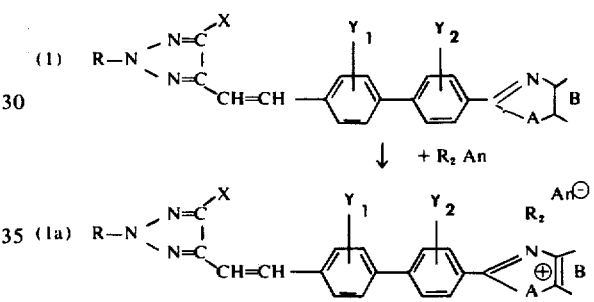

This quaternisation is carried out, for example, in a solvent which is inert towards the reactants, at temperatures of 0° to 200°C, preferably at 20° to 150°C. Examples of such solvents are aromatic hydrocarbons, such as benzene, toluene and xylene; halogenated hydrocarbons such as methylene chloride, tetrachloroethylene, chlorobenzene, bromobenzene or dichlorobenzene, and also nitrobenzene, lower alkanols and open or cyclic ethers such as ethanol, isopropanol, butanol, diethyl ether, dibutyl ether, ethylene glycol monomethyl ether, ethylene glycol monoethyl ether, tetrahydrofurane or dioxane; lower ketones such as acetone or methyl ethyl ketone; fatty acid amides such as dimethylformamide or dimethylacetamide; sulphoxides such as dimethylsulphoxide and ureas such as tetramethylurea. If desired, the quaternary salts produced can be converted into other salts by double decomposition.

The reaction described above can in principle be carried out with any quaternising agent. Examples of such quaternising agents are alkyl halides such as methyl iodide, butyl bromide, dialkyl sulphates such as dimethylsulphate or diethylsulphate, aralkyl halides such as benzyl chloride or bromide, halogenoacetic acid esters and their derivatives and esters of benzenesulphonic acid or of p-toluenesulphonic acid, especially their methyl esters or ethyl esters.

The new compounds defined above show a more or less pronounced fluorescence in the dissolved or finely divided state. They can be used for the optical brightening of the most diverse synthetic, semi-synthetic or natural organic materials or substances which contain such organic materials.

The following groups of organic materials, where optical brightening thereof is relevant, may be mentioned as examples of the above, without the survey given below being intended to express any restriction thereto:

I. Synthetic organic high molecular materials:

a. Polymerisation products based on organic compounds containing at least one polymerisable carbon-carbon double bond, that is to say their homopolymers or copolymers as well as their after-treatment products such as, for example, cross-linking, grafting or degradation products, polymer blends or products obtained by modification of reactive groups, for example polymers based on $\alpha,\beta$-unsaturated carboxylic acids or derivatives of such carboxylic acids, especially on acrylic compounds (such as, for example, acrylic esters, acrylic acid, acrylonitrile, acrylamides and their derivatives or their methacryl analogues), on olefine hydrocarbons (such as, for example, ethylene, propylene, styrenes or dienes and also so-called ABS polymers), and polymers based on vinyl and vinylidene compounds (such as, for example, vinyl chloride, vinyl alcohol and vinylidene chloride), b. Polymerisation products such as are obtainable by ring opening, for example, polyamides of the polycaprolactam type, and also polymers which are obtainable both via polyaddition and via polycondensation, such as polyethers or polyacetals.

c. Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyester) or unsaturated (for example maleic acid-dialcohol polycondensates as well as their crosslinking products with copolymerisable vinyl monomers), unbranched and branched (also including those based on polyhydric alcohols, such as, for example alkyd resins) polyesters, polyamides (for example hexamethylenediamine adipate), maleate resins, melamine resins, their precondensates and analogues, polycarbonates and silicones, d. Polyaddition products such as polyurethanes (crosslinked and non-crosslinked) and epoxide resins.

II. Semi-synthetic organic materials, for example, cellulose esters of varying degrees of esterification (so-called 2½ acetate or triacetate) or cellulose ethers, regenerated cellulose (viscose or cuprammonium cellulose), or their after-treatment products, and casein plastics.

III. Natural organic materials of animal or vegetable origin, for example based on cellulose or proteins, such as cotton, wool, linen, silk, natural lacquer resins, starch and casein.

The organic materials to be optically brightened can be in the most diverse states of processing (raw materials, semi-finished goods or finished goods). On the other hand, they can be in the form of structures of the most diverse shapes, say for example predominantly three-dimensional bodies such as sheets, profiles, injection mouldings, various machined articles, chips, granules or foams, and also as predominantly two-dimensional bodies such as films, foils, lacquers, coatings, impregnations and coatings, or as predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flocked structures or woven textile fabrics, textile laminates, knitted fabrics and papers, cardboards or paper compositions.

The compounds to be used according to the invention are of importance, inter alia, for the treatment or organic textile materials, especially woven textile fabrics. Where fibres, which can be in the form of staple fibres or endless filaments or in the form of hanks, woven fabrics, knitted fabrics, fleeces, flocked substrates or laminates, are to be optically brightened according to the invention, this is advantageously effected in an aqueous medium, wherein the compounds in question are present in a finely divided form (suspensions, so-called microdispersions or possibly solutions). If desired, dispersing agents, stabilisers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20° to 140°C, for example at the boiling point of the bath or near it (about 90°C). Solutions or emulsions in organic solvents can also be used for the finishing, according to the invention, of textile substrates, as is practised in the dyeing trade in so-called solvent dyeing (pad-thermofix application, or exhaustion dyeing process in dyeing machines).

The new optical brighteners according to the present invention can further be added to, or incorporated in, the materials before or during their shaping. Thus they can, for example, be added to the compression moulding composition or injection moulding composition during the manufacture of films, sheets (for example, hot milling into polyvinyl chloride) or mouldings.

Where fully synthetic or semi-synthetic organic materials are being shaped by spinning processes or via spinning compositions, the optical brighteners can be applied in accordance with the following processes:

Addition of the starting substances (for example monomers) or intermediates (for example precondensates or prepolymers), that is to say before or during the polymerisation, polycondensation or polyaddition, Powdering onto polymer chips or granules for spinning compositions, Bath dyeing of polymer chips or granules for spinning compositions, Metered addition to spinning melts or spinning solutions, and Application to the tow before stretching.

The new optical brighteners according to the present invention can, for example, also be employed in the following use forms:

a. Mixed with dyestuffs (shading) or pigments (coloured pigments or especially, for example, white pigments), or as an additive to dye baths, printing pastes, discharge pastes or reserve pastes, or for the after-treatment of dyeings, prints or discharge prints.

b. Mixed with so-called "carriers", wetting agents, plasticisers, swelling agents, anti-oxidants, light protection agents, heat stabilisers and chemical bleaching agents (chlorite bleach or bleaching bath additives).

c. Mixed with crosslinking agents or finishing agents (for example starch or synthetic finishes), and in combination with the most diverse textile finishing processes, especially synthetic resin finishes (for example creaseproof finishes such as "wash-and-wear," "permanent-press" or "no-iron"), as well as flameproof finishes, soft handle finishes, antisoiling finishes or antistatic finishes, or antimicrobial finishes.

d. Incorporation of the optical brighteners into polymeric carriers (polymerisation, polycondensation or polyaddition products), in a dissolved or dispersed form, for use, for example, in coating agents, impregnating agents or binders (solutions, dispersions and emulsions) for textiles, fleeces, paper and leather.

e. As additives to so-called "master batches."

f. As additives to the most diverse industrial products in order to render these more marketable (for example improving the appearance of soaps, detergents, pigments), g. In combination with other optically brightening substances, h. In spinning bath preparations, that is to say as additives to spinning baths such as are used for improving the slip for the further processing of synthetic fibres, or from a special bath before the stretching of the fibre.

i. As scintillators for various purposes of a photographic nature, such as, for example, for electrophotographic reproduction or supersensitisation, and for the optical brightening of photographic layers, optionally in combination with white pigments such as, for example, $TiO_2$.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrates, for example of polyester fibres, with the brighteners according to the invention is to impregnate these fibres with the aqueous dispersions (or optionally also solutions) of the brighteners at temperatures below 75°C, for example at room temperature, and to subject them to a dry heat treatment at temperatures above 100°C, it being generally advisable additionally to dry the fibre material beforehand at a moderately elevated temperature, for example at not less than 60°C and up to about 130°C. The heat treatment in the dry state is then advantageously carried out at temperatures between 120° and 225°C, for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0001 per cent by weight. However, amounts of up to about 0.8 per cent by weight and optionally of up to about 2 per cent by weight can be employed. For most practical purposes, amounts between 0.0005 and 0.5 per cent by weight are of preferred interest.

The new optical brightening agents are also particularly suitable for use as additives for wash liquors or industrial and domestic washing agents, to which they can be added in various ways. They are appropriately added to wash liquors in the form of their solutions in water or organic solvents or in a finely divided form, as aqueous dispersions. They are advantageously added to domestic or industrial washing agents in any stage of the manufacturing process of the washing agents, for example to the so-called "slurry" before spray-drying to the washing powder, or during the preparation of liquid washing agent combinations. They can be added either in the form of a solution or dispersion in water or other solvents or, without auxiliaries, as a dry brightening powder. For example, the brightening agents can be mixed, kneaded or ground with the detergent substances and, in this form, admixed to the finished washing powder. However, they can also be sprayed in a dissolved or pre-dispersed form onto the finished washing agent.

Possible washing agents are the known mixtures of detergent substances such as, for example, soap in the form of chips and powders, synthetics, soluble salts or sulphonic acid half esters of higher fatty alcohols, arylsulphonic acids with higher and/or multiple alkyl substituents, sulphocarboxylic acid esters of medium to higher alcohols, fatty acid acylaminoalkyl- or acylaminoaryl-glycerinesulphonates, phosphoric acid esters of fatty alochols and the like. Possible so-called "builders" which can be used are, for example, alkali metal polyphosphates and polymetaphosphates, alkali metal pyrophosphates, alkali metal salts of carboxymethylcellulose and other "soil redeposition inhibitors", and also alkali metal silicates, alkali metal carbonates, alkali metal borates, alkali metal perborates, nitrilotriacetic acid, ethylenediaminotetraacetic acid, and foam stabilisers such as alkanolamides of higher fatty acids. The washing agents can further contain for example: antistatic agents, skin protection agents which restore fat, such as lanolin, enzymes, anti-microbial agents, perfumes and dyestuffs.

The new optical brighteners have the particular advantage that they are also active in the presence of active chlorine donors such as, for example, hypochlorite, and can be used without significant loss of the effects in wash liquors containing non-ionic washing agents, for example alkylphenol polyglycol ethers.

The compounds according to the invention are added in amounts of 0.005–1% or more, relative to the weight of the liquid or pulverulent finished washing agent. Wash liquors which contain the indicated amounts of the optical brighteners claimed impart a brilliant appearance in daylight when used to wash textiles of cellulose fibres, polyamide fibres, cellulose fibres with a high quality finish, polyester fibres, wool and the like.

The washing treatment is carried out as follows, for example:

The textiles indicated are treated for 1 to 30 minutes at 20° to 100°C in a wash liquor which contains 1 to 10 g/kg of a built-up composite washing agent and 0.05 to 1%, relative to the weight of the washing agent, of the claimed brightening agents. The liquor ratio can be 1:3 to 1:50. After washing, the textiles are rinsed and dried in the usual manner. The wash liquor can contain 0.2 g/l of active chlorine (for example as hypochlorite) or 0.1 to 2 g/l of sodium perborate as a bleaching additive.

In the examples the parts, unless otherwise stated, are always parts by weight and the percentages are always percentages by weight. Unless otherwise noted, melting points and boiling points are uncorrected.

EXAMPLE 1

9.94 g (0.02 mol) of the phosphonate of the formula

(28) 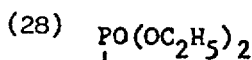

and 3.46 g (0.02 mol) of the aldehyde of the formula

(29) 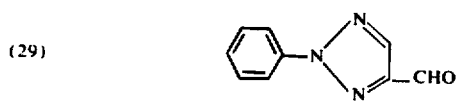

are stirred in 160 ml of anhydrous dimethylformamide in a stream of nitrogen and 6.0 g of sodium methylate are added. The temperature of the reaction mixture rises to 30°C whilst the mixture assumes a strong violet colour. It is stirred for a further 5 hours at 40° to 45°C, the orange suspension is then diluted with 300 ml of methanol and the product is filtered off, washed with methanol and dried in vacuo at 80°C. 8.8 g (85.5% of theory) of the compound of the formula

(30) 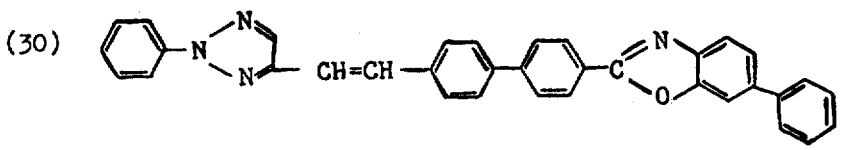

are obtained as yellow powder which melts in an indefinite manner, and incompletely, above 260°C. Recrystallisation from trichlorobenzene with the aid of fuller's earth yields yellow glistening flakes which melt in an indefinite manner, and incompletely, above 269°C.

| $C_{35}H_{24}ON_4$ | | | |
|---|---|---|---|
| Calculated: | C 81.37 | H 4.68 | N 10.85 |
| Found: | C 81.08 | H 4.59 | N 10.93 |

Analogously, the corresponding phosphonates yield the ethylenes of the formulae

(31) 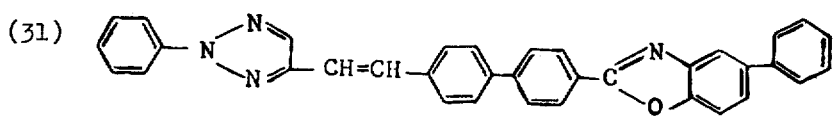

Yellow crystals from trichlorobenzene, which melt in an indefinite manner and incompletely above 250°C.

| $C_{35}H_{24}ON_4$ | | | |
|---|---|---|---|
| Calculated: | C 81.37 | N 4.68 | N 10.85 |
| Found: | C 80.9 | H 4.8 | N 10.6 |

(32) 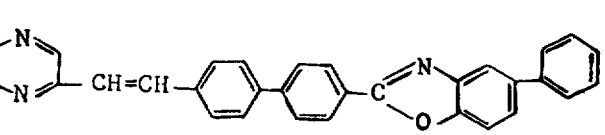

Yellow crystals from tetrachloroethylene, of melting point 234° to 236°C.

| $C_{33}H_{22}ON_4$ | | | |
|---|---|---|---|
| Calculated: | C 80.80 | H 4.52 | N 11.42 |
| Found: | C 80.57 | H 4.52 | N 11.35 |

(33) 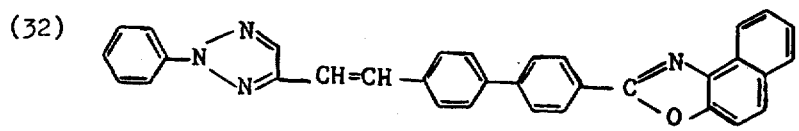

Light yellow crystals from chlorobenzene, of melting point 255° to 256°C.

| $C_{33}H_{28}ON_4$ | | | |
|---|---|---|---|
| Calculated: | C 79.81 | H 5.68 | N 11.28 |
| Found: | C 79.69 | H 5.64 | N 11.23 |

(34) 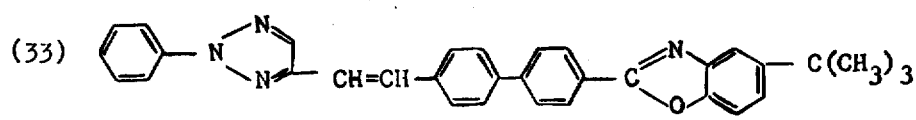

Pale yellow crystals from chlorobenzene, of melting point 274° to 276°C.

| $C_{29}H_{20}ON_4$ | | | |
|---|---|---|---|
| Calculated: | C 79.07 | H 4.58 | N 12.72 |
| Found: | C 78.97 | H 4.59 | N 12.62 |

(35) 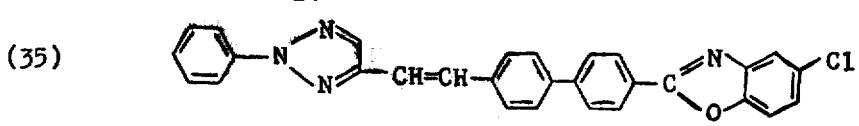

| | | | | |
|---|---|---|---|---|
| Pale yellow crystals from chlorobenzene, of melting point 261° to 263°C. | | | Almost colourless platelets from dichlorobenzene, of melting point 284° to 285°C. | |

| $C_{29}H_{19}ON_4Cl$ | | | | $C_{33}H_{27}ClN_4O \cdot \frac{1}{8}$ dichlorobenzene | | | |
|---|---|---|---|---|---|---|---|
| Calculated: | C 73.34 | H 4.03 | N 11.80 | Cl 7.46 | Calculated: | C 73.75 | H 5.04 | N 10.21 | Cl 8.07 |
| Found: | C 73.26 | H 4.06 | N 11.63 | Cl 7.70 | Found: | C 73.40 | H 5.01 | N 9.92 | Cl 8.32 |

(36) 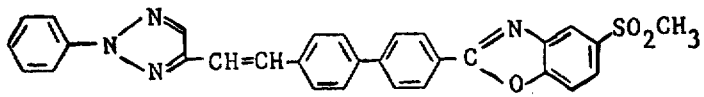

(39) 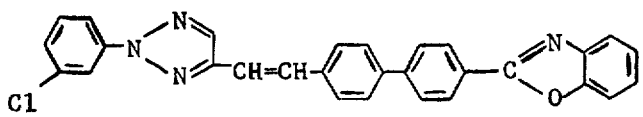

| | | | | |
|---|---|---|---|---|
| Yellow crystals from dichlorobenzene, of melting point 238° to 239°C. | | | Yellow needles from dichlorobenzene, of melting point 268° to 270°C. | |

| $C_{30}H_{22}O_3N_4S$ | | | | $C_{29}H_{19}ClN_4O$ | | | |
|---|---|---|---|---|---|---|---|
| Calculated: | C 69.48 | H 4.28 | N 10.80 | S 6.18 | Calculated: | C 73.34 | H 4.03 | N 11.80 | Cl 7.46 |
| Found: | C 69.61 | H 4.36 | N 10.55 | S 6.02 | Found: | C 73.07 | H 4.02 | N 11.64 | Cl 7.58 |

(37) 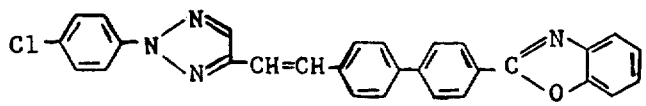

(40) 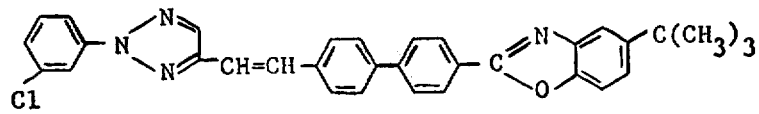

| | | | | |
|---|---|---|---|---|
| Yellow platelets from dichlorobenzene, of melting point 262° to 264°C. | | | Yellow crystals from dichlorobenzene, of melting point 245° to 247°C. | |

| $C_{29}H_{19}ClN_4O$ | | | | $C_{33}H_{27}ClN_4O$ | | | |
|---|---|---|---|---|---|---|---|
| Calculated: | C 73.34 | H 4.03 | N 11.80 | Cl 7.46 | Calculated: | C 74.64 | H 5.12 | N 10.55 | Cl 6.68 |
| Found: | C 73.28 | H 3.94 | N 11.74 | Cl 7.39 | Found: | C 74.61 | H 5.15 | N 10.44 | Cl 6.80 |

(38) 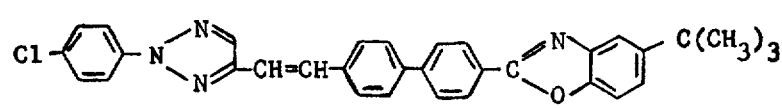

(41) 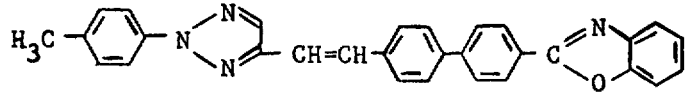

Almost colourless crystals from chlorobenzene, of melting point 265° to 267°C.

| $C_{30}H_{22}N_4O$ | | | |
|---|---|---|---|
| Calculated: | C 79.27 | H 4.88 | N 12.33 |
| Found: | C 79.17 | H 4.79 | N 12.23 |

The phosphonates used as starting materials are obtained as follows: 5,020 g (20 mols) of 4,4'-bis-chloromethyldiphenyl are stirred in 35 l of 40 per cent strength nitric acid for 16 hours at 90° to 95°C, after cooling the suspension is filtered, the residue is washed with water, the beige powder, whilst still moist, is stirred in 40 l of water and 6 l of 30 per cent strength

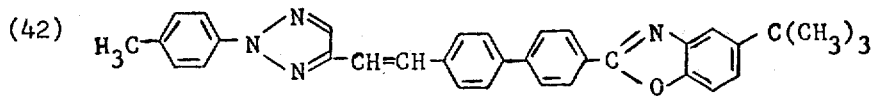

(42)

Yellow crystals from chlorobenzene, of melting point 268° to 270°C.

| $C_{34}H_{30}N_4O$ | | | |
|---|---|---|---|
| Calculated: | C 79.97 | H 5.92 | N 10.97 |
| Found: | C 80.04 | H 6.13 | N 11.07 | sodium hydroxide solution for 1 hour at the reflux temperature, the mixture is clarified by filtration through a steam-heated pressure filter and the filtrate is left to cool for some hours. The crude sodium salt of the formula The compounds of the formula (43) are obtained analogously

(56) 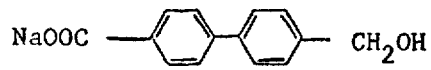

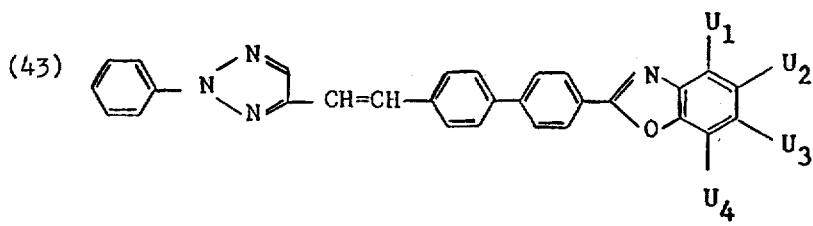

(43)

| Compound | $U_1$ | $U_2$ | $U_3$ | $U_4$ |
|---|---|---|---|---|
| (44) | —H | —C(CH₃)₂—CH₂—C(CH₃)₂—CH₃ | —H | —H |
| (45) | —H | —CH₂—CH(C₂H₅)—(CH₂)₃—CH₃ | —H | —H |
| (46) | —H | —CH(CH₃)₂ | —H | —H |
| (47) | —H | —(CH₂)₄CH₃ | —H | —H |
| (48) | —H | —C₆H₁₁ | —H | —H |
| (49) | —H | —OCH₃ | —H | —H |
| (50) | —H | —H | —OCH₃ | —H |
| (51) | —H | —H | —O—C₆H₅ | —H |
| (52) | —H | —CH₂—C₆H₅ | —H | —H |
| (53) | —H | —C(CH₃)₂—C₆H₅ | —H | —H |
| (54) | —CH₂—CH₂—CH₂—CH₂— | | —H | —H |
| (55) | —H | —C(CH₃)₃ | —H | —C(CH₃)₃ | which crystallises out is filtered off (the sodium salt of diphenyl-4,4'-dicarboxylic acid remains in solution) and dissolved in 25 l of hot water, and the filtrate is strongly acidified with 2 l of concentrated hydrochloric acid. After filtration, washing with water and drying, 1,600 g of the crude carboxylic acid of the formula

(57) 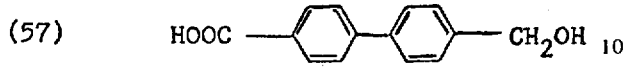

are obtained as a light beige powder of melting point 264° to 268°C. 280 g (1.25 mols) of the crude 4-hydroxymethyldiphenyl-4'-carboxylic acid just described are dissolved in 3 l of dimethylformamide and 300 ml of glacial acetic acid and hydrogenated catalytically with the aid of 30 g of 10 per cent strength palladium on charcoal under normal pressure at room temperature. After approx. 4 hours the absorption of hydrogen ceases at approx. 33 litres (approx. 125% of the amount calculated for pure starting material). The catalyst is filtered off, the filtrate is concentrated to approx. 400 ml in vacuo and left to crystallise for approx. 3 hours and the product is filtered off, washed with carbon tetrachloride and dried. 214 g (81% of theory) of the acid of the formula

(58) 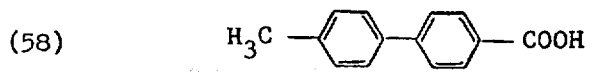

are obtained as beige crystals of melting point 248° to 253°C. A sample converted into the methyl ester for analytical purposes melts at 118° to 119°C.

| $C_{15}H_{14}O_2$ | | |
|---|---|---|
| Calculated: | C 79.62 | H 6.24 |
| Found: | C 79.69 | H 6.31 |

42.4 g (0.2 mol) of 4-methyl-diphenyl-4'-carboxylic acid and 37.0 g (0.2 mol) of 3-hydroxy-4-aminodiphenyl in 80 ml of a mixture of chlorinated diphenyls, in the presence of 1.5 g of boric acid, are heated in a stream of nitrogen from 20° to 212°C over the course of 3 hours and then to 300°C over the course of approx. 20 minutes. After cooling, dilution with 150 ml of methanol, filtering, washing and drying 67 g (93% of theory) of the benzoxaole of the formula (59)

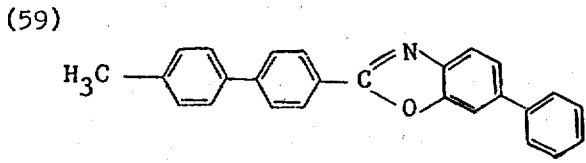

are obtained as glistening scales of melting point 203° to 205°C. Recrystallisation from o-dichlorophenol gives colourless flakes of melting point 195° to 197°C.

| $C_{26}H_{19}ON$ | | | |
|---|---|---|---|
| Calculated: | C 86.40 | H 5.30 | N 3.88 |
| Found: | C 85.70 | H 5.28 | N 3.85 |

Analogously, the appropriate amonophenols yield the benzoxazoles of the formulae

(60) 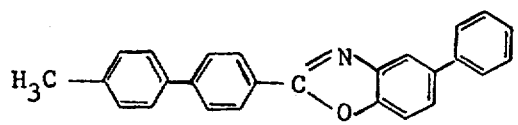

Colourless crystals from o-dichlorobenzene, of melting point 211° to 213°C.

| $C_{26}H_{19}ON$ | | | |
|---|---|---|---|
| Calculated: | C 86.40 | H 5.30 | N 3.88 |
| Found: | C 86.14 | H 5.14 | N 4.06 |

(61) 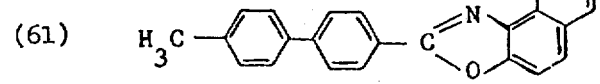

Colourless crystals from xylene, of melting point 157° to 159°C.

| $C_{24}H_{17}ON$ | | | |
|---|---|---|---|
| Calculated: | C 85.94 | H 5.11 | N 4.18 |
| Found: | C 86.86 | H 5.23 | N 4.28 |

(62) 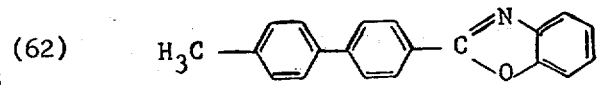

Colourless crystals, after distillation in a high vacuum, of melting point 160° to 161°C.

| $C_{20}H_{15}ON$ | | | |
|---|---|---|---|
| Calculated: | C 84.18 | H 5.30 | N 4.91 |
| Found: | C 84.21 | H 5.33 | N 4.87 |

(63)

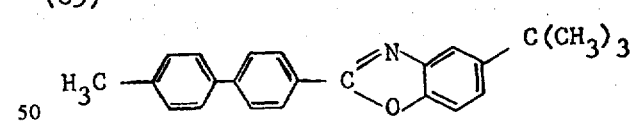

Colourless crystals from hexane, of melting point 160.5° to 161°C.

| $C_{24}H_{23}NO$ | | | |
|---|---|---|---|
| Calculated: | C 84.42 | H 6.79 | N 4.10 |
| Found: | C 84.28 | H 6.83 | N 4.18 | and of the general formula (64)

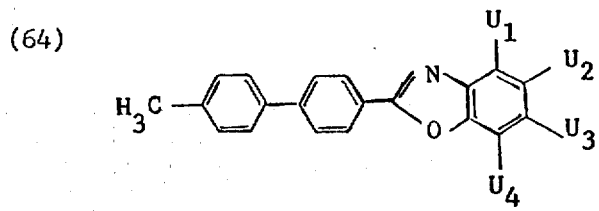

| Compound | $U_1$ | $U_2$ | $U_3$ | $U_4$ |
|---|---|---|---|---|
| (65) | —H | —C(CH₃)₂—CH₂—C(CH₃)₃ | —H | —H |
| (66) | —H | —CH₂—CH(C₂H₅)—(CH₂)₃—CH₃ | —H | —H |
| (67) | —H | —CH(CH₃)₂ | —H | —H |
| (68) | —H | —(CH₂)₄CH₃ | —H | —H |
| (69) | —H | —C₆H₁₁ | —H | —H |
| (70) | —H | —OCH₃ | —H | —H |
| (71) | —H | —SO₂CH₃ | —H | —H |
| (72) | —H | —H | —OCH₃ | —H |
| (73) | —H | —H | —O—C₆H₅ | —H |
| (74) | —H | —Cl | —H | —H |
| (75) | —H | —CH₂—C₆H₅ | —H | —H |
| (76) | —H | —C(CH₃)₂—C₆H₅ | —H | —H |
| (77) | —CH₂—CH₂—CH₂—CH₂— | | —H | —H |
| (78) | —H | —C(CH₃)₃ | —H | —C(CH₃)₃ |

61.1 g (0.169 mol) of the compound of the formula (59)

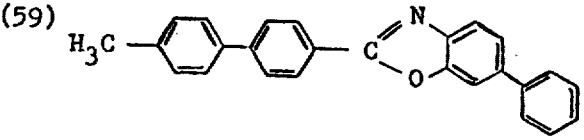

and 51.4 g (0.29 mol) of N-bromosuccinimide in 1,000 ml of carbon tetrachloride, in the presence of 1.2 g of dibenzoyl peroxide, are stirred for 16 hours at the reflux temperature whilst being irradiated with ultraviolet light. After cooling, filtering off, washing with carbon tetrachloride and drying, 102.3 g of pale yellow product are obtained. This is freed of the succinimide produced by suspending it three times in 2,000 ml of water at a time, and is dried in vacuo at 80°C. 72.2 g of the crude compound of the formula (79)

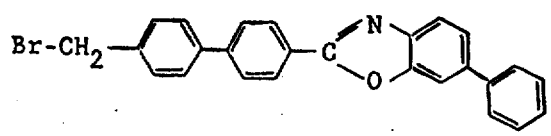

are obtained as beige crystals of melting point 201° to 203°C. The purification of this sparingly soluble but sensitive compound is dispensed with. Analogously, the bromides are manufactured from the abovementioned 4-methyl-4'-benzoxazolyl diphenyls and are processed further without purification.

70 g of the crude bromide of the formula (79) and 60 ml of triethyl phosphite are stirred for 1 hour at 152° to 155°C whilst distilling off 16.2 g of ethyl bromide, after cooling the mixture is diluted with 150 ml of hexane and filtered, and the filter residue is washed with hexane and dried in vacuo at 80°C. 71.2 g of the crude phosphonate of the formula

(28) 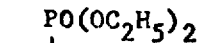

are obtained as a yellowish powder of melting point 155° to 180°C. Recrystallisation from toluene gives almost colourless crystals of melting point 168° to 169°C.

| C₃₀H₂₅O₄NP | | | | |
|---|---|---|---|---|
| Calculated: | C 72.42 | H 5.67 | N 2.82 | P 6.23 |
| Found: | C 71.78 | H 5.65 | N 2.64 | P 6.24 |

The remaining phosphonates are also obtained from the methyl compounds described above in the same manner, for example the compounds of the formulae

(80) 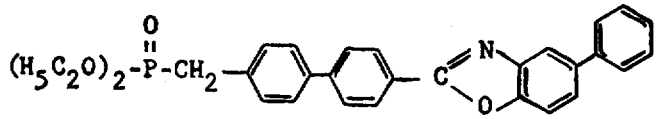

Melting point: 170° to 171°C.

| C₃₀H₂₅O₄NP | | | | |
|---|---|---|---|---|
| Calculated: | C 72.42 | H 5.67 | N 2.82 | P 6.23 |
| Found: | C 72.23 | H 5.61 | N 2.67 | P 6.11 |

(81) 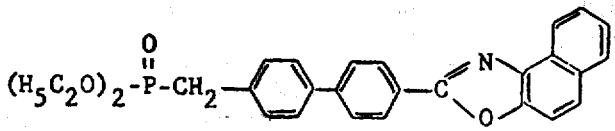

(85) 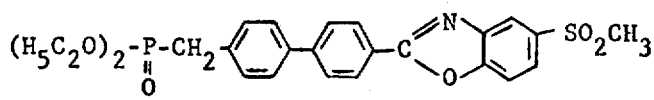

Melting point: 108° to 110°C.

| $C_{28}H_{26}O_4NP$ | | | | |
|---|---|---|---|---|
| Calculated: | C 71.33 | H 5.56 | N 2.97 | P 6.57 |
| Found: | C 70.05 | H 5.33 | N 2.97 | P 6.40 |

Melting point 164° to 166°C.

EXAMPLE 2

6.0 g of sodium methylate are introduced into a mixture of 8.4 g (0.02 mol) of the phosphonate of the formula

(82) 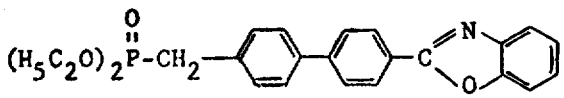

(82) 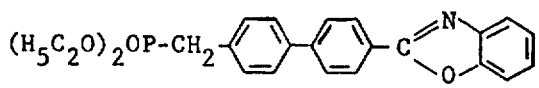

Melting point 147° to 149°C

| $C_{24}H_{24}O_4NP$ | | | | |
|---|---|---|---|---|
| Calculated: | C 68.40 | H 5.74 | N 3.32 | P 7.35 |
| Found: | C 68.23 | H 5.67 | N 3.57 | P 7.26 | described in Example 1 and 5.5 g (0.02 mol) of the aldehyde of the formula

(86) 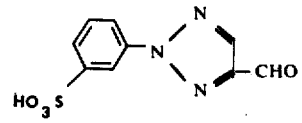

(83) 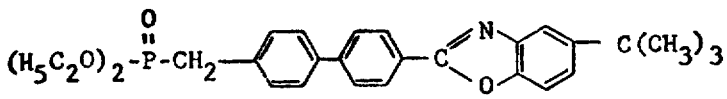

Melting point 129° to 131°C.

| $C_{28}H_{32}O_4NP$ | | | | |
|---|---|---|---|---|
| Calculated: | C 70.42 | H 6.75 | N 2.93 | P 6.49 |
| Found: | C 70.12 | H 6.62 | N 2.66 | P 6.50 | in 200 ml of dimethylformamide. The temperature rises to about 32°C and is raised to 42°C by heating, after which the mixture is stirred for 3 hours in a stream of nitrogen at 42° to 46°C. After cooling, pouring out into 300 ml of water, filtering, washing and drying, 9.0 g of the crude compound of the formula

(87) 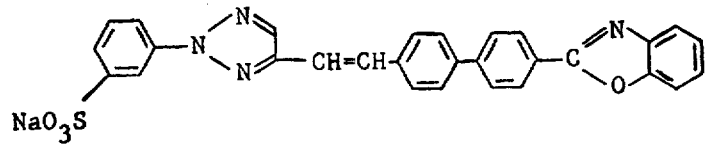

(84) 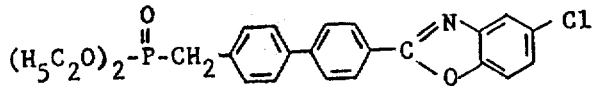

Melting point 120° to 123°C and are obtained as light brown lumps. Recrystallisation from a large amount of boiling dimethylformamide, with filtration to clarify the mixture, yields 5.3 g of greenish crystal powder.

| $C_{24}H_{19}O_4N_4NaS$ | | | | |
|---|---|---|---|---|
| Calculated: | C 64.20 | H 3.53 | N 10.33 | S 5.91 |
| Found: | C 64.75 | H 3.90 | N 10.50 | S 5.50 |

(90)

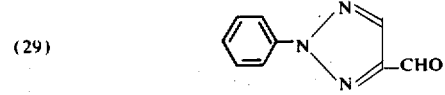

The sulphonated aldehyde used as the starting material is manufactured as follows:

17.3 g (0.1 mol) of the aldehyde of the formula (29)

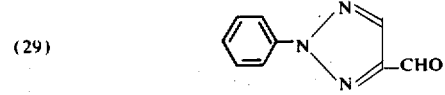

in 80 g of oleum containing 10% of $SO_3$ are stirred for 23 hours at room temperature, the dark brown solution is poured out onto 500 g of ice and the aldehydesulphonic acid is filtered off, washed with water and dried in vacuo at 45°C. Yield: 19.6 g (77.5% of theory) of a beige powder which melts above 330°C.

EXAMPLE 3

3.86 g (0.01 mol) of the acid chloride of the formula (88)

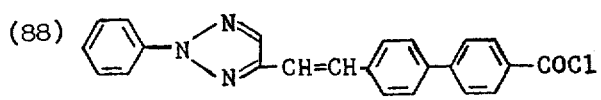

are introduced over the course of 20 minutes into a solution of 1.45 g (0.0105 mol) of 2-nitroaniline in 20 ml of pyridine and the yellow suspension is then stirred for 1 hour at 80° to 85°C. The resulting clear solution is allowed to cool and the crystals formed are filtered off, washed with alcohol and dried. 3.8 g (78% of theory) of the nitroanilide of the formula (89)

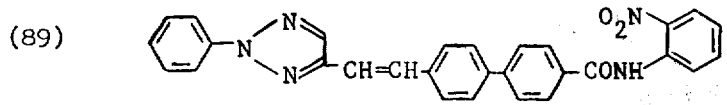

are obtained as greenish-yellow crystals of melting point 184° to 185°C. 3.66 g (0.0075 mol) thereof are dissolved in 120 ml of 2-methoxyethanol at 110°C, the solution is allowed to cool and a solution of 8.03 g of tin-II chloride dihydrate in 16 ml of concentrated hydrochloric acid is added dropwise at 80° to 90°C over the course of 20 minutes. Hereupon, a yellow-green precipitate separates out from the clear solution. The mixture is stirred for 3 hours at 104° to 106°C, allowed to cool to 50° – 60°C and poured into 400 ml of 1 N sodium hydroxide solution. The beige suspension is filtered and the residue is washed with water until free of alkali and dried in vacuo at 75° to 80°C. The crude benzimidazole of the formula

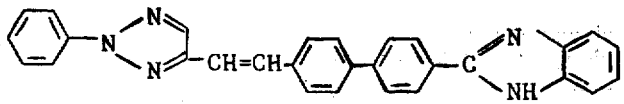

weighs 3.35 g and melts incompletely at 278° to 280°C. Recrystallisation from 60 ml of 2-methoxyethanol and 10 ml of water yields 2.9 g (88% of theory) of yellowish crystals of melting point 278° to 280°C. A further recrystallisation from dichlorobenzene with the aid of aluminium oxide yields 2.4 g of yellowish crystals of melting point 281° to 283°C after sintering at 230°C.

| $C_{29}H_{21}N_5$ . 1/6 mol dichlorobenzene | | | |
|---|---|---|---|
| Calculated: | C 77.55 | H 4.71 | N 15.10 |
| Found: | C 77.15 | H 4.90 | N 15.55 |

The test for chlorine is positive.

The acid chloride used as the starting material is obtained as follows:

22.8 g (0.1 mol) of the acid of the formula (57)

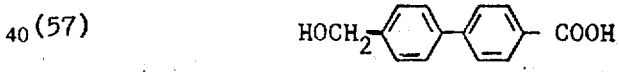

described in Example 1 in 100 ml of chloroform and 1 ml of dimethylformamide are treated dropwise with 26 ml of thionyl chloride over the course of 40 minutes at the reflux temperature. The brownish clear solution is evaporated to constant weight in vacuo. 27.3 g of the crude acid chloride of the formula (91)

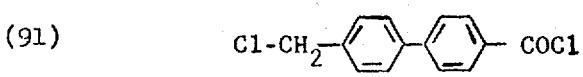

are obtained as a light brown oil. A sample purified by distillation in a high vacuum at 150°C yields colourless crystals of melting point 56° to 57°C.

| $C_{14}H_{10}Cl_2O$ | | | |
|---|---|---|---|
| Calculated: | C 63.42 | H 3.81 | Cl 26.75 |
| Found: | C 63.21 | H 3.78 | Cl 26.90 |

The crude acid chloride in 300 ml of methanol is carefully warmed to 40°C and the mixture is stirred for (94)

3 hours at 35° to 40°C. The suspension is allowed to cool and the product is filtered off, washed with methanol and dried in vacuo at 70°C, whereby 22.1 g (84.8% of theory relative to the carboxylic acid employed over both stages) of the ester of the formula

(92) 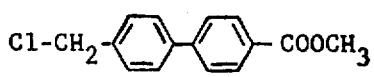

are obtained as almost colourless crystals of melting point 121° to 123°C. A sample distilled in a high vacuum at 125° to 130°C melts at 124° to 125.5°C.

| $C_{15}H_{13}ClO_3$ | | | | |
|---|---|---|---|---|
| Calculated: | C 69.10 | H 5.03 | O 12.27 | Cl 13.60 |
| Found: | C 68.92 | H 5.00 | O 11.58 | Cl 14.27 |

13.03 g (0.05 mol) of the crude ester are dissolved in 11.8 g (0.1 mol) of triethyl phosphite at 95°C and the solution is warmed to 170°C over the course of 7 hours, during which 2.05 g of ethyl chloride distil off. Thereafter the excess phosphite is distilled off in vacuo and the residue is allowed to crystallise. 18.6 g of crude phosphonate of the formula

(93) 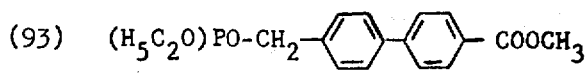

are obtained as almost colourless crystals of melting point 64° to 66°C.

| $C_{19}H_{21}O_5P$ | | |
|---|---|---|
| Calculated: | C 62.98 | H 6.40 |
| Found: | C 61.91 | H 6.28 |

18.15 g (0.05 mol) of the phosphonate (93) described above and 8.65 g (0.05 mol) of the aldehyde of the formula

(29) 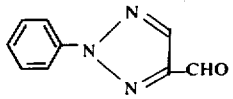

in 250 ml of dimethylformamide are treated at room temperature with 15 g of sodium methylate. The temperature rises to 44°C and is kept at 43° to 45°C for 30 minutes by heating. The red-brown suspension is poured into 600 ml of methanol and the precipitate is filtered off, washed with methanol and dried. 13.1 g (69% of theory) of the ester of the formula

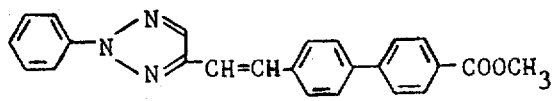

are obtained as greenish crystals of melting point 175° to 177°C. Recrystallisation from 500 ml of toluene yields almost colourless crystals of melting point 175° to 177°C.

| $C_{24}H_{19}N_3O_2$ | | | |
|---|---|---|---|
| Calculated: | C 75.57 | H 5.02 | N 11.02 |
| Found: | C 75.54 | H 5.05 | N 10.88 |

9.55 g (0.025 mol) thereof are dissolved in 500 ml of 2-methoxyethanol at the boil, 25 ml of 2 N sodium hydroxide solution are added and the mixture is stirred for 45 minutes at the reflux temperature. The white suspension is dissolved by means of 500 ml of water and then acidified with 25 ml of 20 per cent strength hydrochloric acid, and after cooling the product is filtered off, washed and dried. 9.05 g (99% of theory) of the carboxylic acid of the formula

(95) 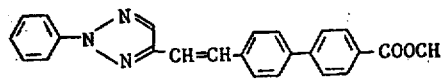

are obtained as a white powder which melts at 235°C. 7.35 g (0.02 mol) thereof are suspended in 350 ml of chloroform and 0.2 ml of dimethylformamide, and 8 ml of thionyl chloride are added. After stirring at the reflux temperature for 2 ¾ hours, the slightly cloudy solution is concentrated by distilling off 200 ml of chloroform, the residue is diluted with 150 ml of hexane and cooled to 0° – 10°C and the crystals are filtered off, washed with hexane and dried. 7.6 g (98% of theory) of the acid chloride of the formula

(96) 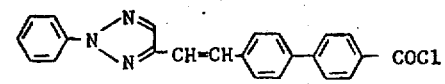

are obtained as yellowish crystals of melting point 208° to 209°C.

EXAMPLE 4

2.05 g (4.67 mols) of the imidazole of the formula

(90) 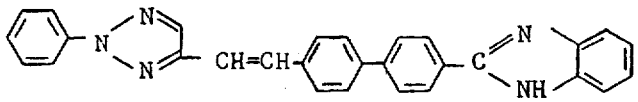

described in Example 3 are suspended in 20 ml of dimethylformamide at room temperature and 0.255 g (4.7 mmols) of sodium methylate is added. Hereupon a clear solution is formed, from which the yellow sodium salt of the imidazole crystallises out immediately. 1.8 g (14 mmols) of dimethyl sulphate are now added thereto. The sodium salt dissolves immediately and the colourless N-methylbenzimidazole crystallises out soon. In order to bring about the quaternisation, the mixture is heated, in the course of which a clear solution is again produced at 55° to 60°C, and is stirred for 1 hour at 95°C. It is then precipitated with 100 ml of dioxane and the quaternary salt is filtered off, washed with water until free of the sodium salt of methylsulphuric acid and dried in vacuo at 90°C. 2.31 g of pale greenish strongly hygroscopic crystals of the compound of the formula

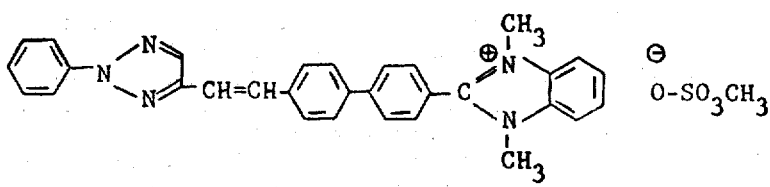

of melting point 200 to 202°C are obtained.

A sample recrystallised from an 800-fold amount of boiling water with clarification by filtration yields greenish fine needles of melting point 207° to 209°C.

| $C_{32}H_{30}N_5O_3S \cdot 1.5\ H_2O$ | | | | |
|---|---|---|---|---|
| Calculated: | C 63.40 | H 5.32 | N 11.55 | S 5.27 |
| Found: | C 63.49 | H 5.26 | N 11.51 | S 4.85 |

EXAMPLE 5

A polyester fabric (for example "Dacron") is padded at room temperature with an aqueous dispersion which contains, per litre, 2 g of the compound of the formula (30) and 1 g of an addition product of about 8 mols of ethylene oxide to 1 mol of p-tert. octylphenol, and is dried at about 100°C. The dry material is subsequently subjected to a heat treatment at 150° to 220°C, of duration between 2 minutes and a few seconds, depending on the temperature. The material treated in this way has a substantially whiter appearance than the untreated material.

The compounds of the formulae (31), (37), (38), (39), (40), (41) and (42) can be used entirely analogously to give a similar effect.

EXAMPLE 6

100 parts of polyester granules to terephthalic acid ethylene glycol polyester are intimately mixed with 0.05 part of a compound of the formula (30) or (31) in a tumbler vessel. The granules are fused at 285°C whilst stirring and spun through customary spinnerets. Strongly brightened polyester fibres are obtained. The compound mentioned can also be added already before or during the polycondensation to give the polyester.

EXAMPLE 7

Bleached polyamide staple fibre fabric (spun nylon) is treated, using a liquor ratio of 1:30, for 30 minutes at 90° to 95°C in a bath which contains, relative to the fibre material, 0.1% of the compound of the formula (30), (31), (32), (41) or (90) and 1% of 40% strength acetic acid. After rinsing and drying, the fabric treated in this way shows a strong brightening.

EXAMPLE 8

10,000 parts of a polyamide in chip form, manufactured in a known manner from ε-caprolactam, are mixed for 12 hours with 30 parts of titanium dioxide (rutile modification) and 2 parts of the compound of the formula (30), (31) or (32) in a tumbler vessel. The chips treated in this way are fused in a kettle heated to 270°C after displacing the atmospheric oxygen and are stirred for half an hour. Thereafter the melt is extruded through a spinneret under a nitrogen pressure of 5 atmospheres gauge and the cooled filament is wound up on a spinning bobbin. The resulting filaments show an excellent brightening effect which is resistant to thermofixing and has good fastness to washing and to light.

EXAMPLE 9

An intimate mixture of 100 parts of polyvinyl chloride, 3 parts of stabiliser (Advastat BD 100; Ba/Cd complex), 2 parts of titanium dioxide, 59 parts of dioctyl phthalate and 0.01 to 0.2 part of the compound of the formula (31) or (32) is milled on a calender at 150° to 155°C, to give a sheet. The opaque polyvinyl chloride sheet thus obtained has a substantially higher degree of whiteness than a sheet which does not contain the optical brightener.

EXAMPLE 10

100 parts of polystyrene and 0.1 part of the compound of the formula (32) are fused, with exclusion of air, for 20 minutes at 210°C in a tube of 1 cm diameter. After cooling, an optically brightened polystyrene mass of good fastness to light is obtained.

EXAMPLE 11

1.5 g of a delustering agent, 1 g of titanium dioxide (rutile type) and 0.05 g of the compound of the formula (32) are stirred into a polyurethane coating composition of 13.3 g of isocyanate-modified polyester, 26.7 g of ethyl acetate, 2 g of reaction accelerator and 2 g of a polyfunctional isocyanate as a crosslinking agent. This mixture is left to stand for 2 hours and is then spread by means of a knife or a film-spreading rod onto a cotton fabric (wet film thickness 1 mm). Thereafter it is dried at room temperature for 24 hours. The fabirc coated in this way shows a strong optical brightening effect of good fastness to light.

EXAMPLE 12

0.12 ml of 85% strength formic acid is added to 100 ml of water. A solution of the optical brightener of the formula (97) according to Example 4 is prepared by dissolving 1 g in 1,000 ml of water. 1.5 ml of this stock solution are added to the solution described above. The liquor thus obtained is warmed to 60°C and a polyacrylonitrile fabric weighing 3 g is introduced into it. The temperature is raised to 95°–98°C over the course of 10–15 minutes and is maintained thereat for 1 hour. The fabric is then rinsed for 2 minutes in running cold water and is subsequently dried for 20 minutes at 60°C. The fabric treated in this way shows a white brilliant appearance.

If the procedure indicated in the above example is followed but instead of the brightener mentioned there the compound of the formula (90) described in Example 3 is used, similar results are obtained.

We claim:

1. An azole compound corresponding to the formula

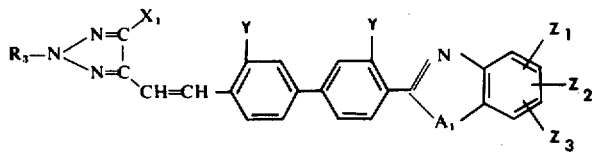

wherein $R_3$ denotes phenyl unsubstituted or substituted by sulpho groups or their salts, halogen, alkyl with one to four carbon atoms, alkenyloxy with three or four carbon atoms, phenyl, alkoxy with one to eight carbon atoms or benzyloxy, $X_1$ represents hydrogen, halogen, alkyl with one to four carbon atoms or phenyl unsubstituted or substituted by halogen, alkyl with one to four carbon atoms or alkoxy with one to four carbon atoms or the sulpho group or its salts, Y represents hydrogen, halogen, alkyl with one to four carbon atoms or alkoxy with one to four carbon atoms, $Z_1$ and $Z_2$ independently of one another represent hydrogen, halogen, alkyl with one to 18 carbon atoms unsubstituted or substituted by carboxyl, carbalkoxy with two to nine carbon atoms, carbamoyl, carbamoyl substituted at the nitrogen by alkyl possessing one to 12 carbon atoms or by hydroxyalkyl, or nitrile, alkoxy with one to 18 carbon atoms, phenyl or phenoxy both unsubstituted or substituted by halogen, alkyl with one to four carbon atoms or alkoxy with one to four carbon atoms, phenylsulphonyl or phenoxysulphonyl both unsubstituted or substituted by halogen, alkyl with one to four carbon atoms or alkoxy with one to four carbon atoms, sulphamoyl, sulphamoyl substituted at the nitrogen by alkyl or hydroxyalkyl with one to 12 carbon atoms, the sulpho group or its salts or $Z_1$ and $Z_2$ in the o-position to one another jointly represent a fused benzene radical, tetramethylene, trimethylene or methylenedioxy, $Z_3$ represents hydrogen, halogen, alkyl with one to four carbon atoms or alkoxy with one to four carbon atoms and $A_1$ represents oxygen or $>N-R_4$ wherein $R_4$ represents hydrogen, alkyl with one to 12 carbon atoms unsubstituted or substituted by hydroxyl, alkoxy with one to four carbon atoms, carboxyl, carbalkoxy with two to five carbon atoms, nitrile, the sulpho group or its salts or alkylsulphonyl with one to four carbon atoms, phenyl or phenyl substituted by halogen, alkyl with one to four carbon atoms or alkoxy with one to four carbon atoms, phenylalkyl, with one to four carbon atoms in the alkyl part, unsubstituted or ring-substituted by halogen, alkyl with one to four carbon atoms or alkoxy with one to four carbon atoms, or cyclohexyl, and a quaternisation product of an imidazole compound of the formula

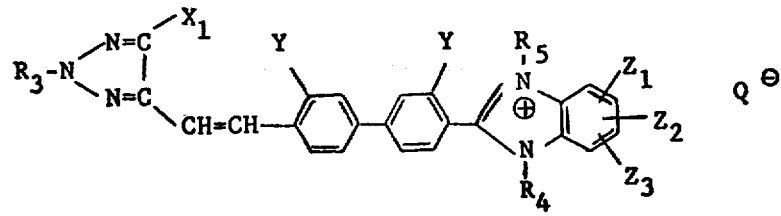

in which $R_3$, $R_4$, $X_1$, Y, $Z_1$, $Z_2$ and $Z_3$ have the above-mentioned meaning, $R_5$ represents alkyl with one to 12 carbon atoms unsubstituted or substituted by hydroxyl or alkoxy with one to four carbon atoms, phenylalkyl with one to four carbon atoms in the alkyl part, unsubstituted or ring-substituted by halogen, alkyl with one to four carbon atoms or alkoxy with one to four carbon atoms, or alkyl with one to four carbon atoms which is substituted by nitrile, carbamoyl or carbalkoxy with two to five carbon atoms and Q represents halogen, an alkylsulphuric acid radical with one to four carbon atoms, an alkanesulphonic acid radical with one to four carbon atoms, a benzene-sulphonic acid radical or a methylsubstituted benzene-sulphonic acid radical or the radical $SO_4{}^{2-}/2$.

2. An azole compound as defined in claim 1 having the formula

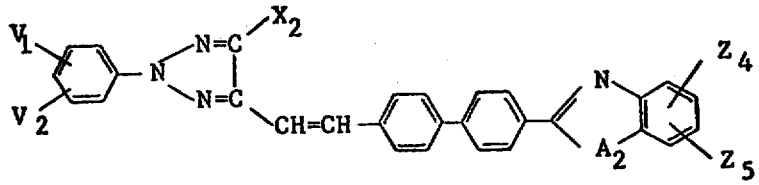

wherein $V_1$ represents hydrogen, the sulphonic acid group or its sodium salt, chlorine, alkyl with one to four carbon atoms or alkoxy with one to four carbon atoms, $V_2$ represents hydrogen, chlorine or alkyl with one to four carbon atoms, $X_2$ represents hydrogen or chlorine, $Z_4$ represents hydrogen, chlorine, alkyl with one to 12 carbon atoms, alkoxy with one to 12 carbon atoms, cyclohexyl, phenylalkyl with one to three carbon atoms in the alkyl part, alkyl with one to four carbon atoms, which is substituted by carbalkoxy with two to five carbon atoms or by carbamoyl which is substituted at the nitrogen with alkyl or hydroxyalkyl with one to four carbon atoms, or phenyl or phenoxy both unsubstituted or substituted by chlorine, methyl or methoxy, $Z_5$ represents hydrogen, chlorine or alkyl with one to four carbon atoms or $Z_4$ and $Z_5$ in the o-position to one another represent a fused benzene radical or tetramethylene and $A_2$ represents oxygen or a radical of the formula $>N—R_6$
wherein $R_6$ denotes hydrogen, methyl, ethyl, hydroxyethyl, cyanoethyl, benzyl or phenyl, and a quaternisation product of an imidazole compound of the formula

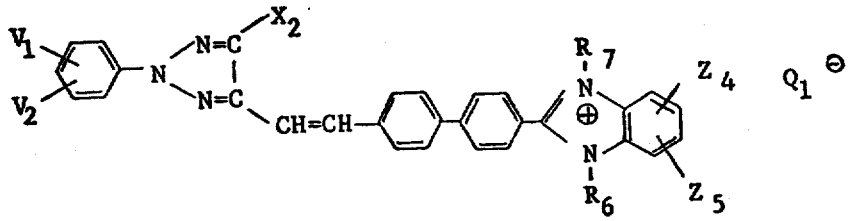

in which $V_1$, $V_2$, $X_2$, $Z_4$, $Z_5$ and $R_6$ have the indicated meaning, $R_7$ represents methyl, ethyl or benzyl and $Q_1$ represents chlorine, bromine, iodine, the methylsulphuric acid radical or the p-toluenesulphonic acid radical.

3. An azole compound as defined in claim 1, wherein A, $A_1$ or $A_2$ denote oxygen.

4. An azole compound as defined in claim 1 having the formula

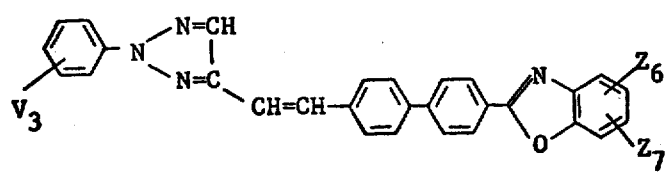

wherein $V_3$ denotes hydrogen, the sulphonic acid group or its sodium salt, chlorine or methyl, $Z_6$ denotes hydrogen, alkyl with one to eight carbon atoms, cyclohexyl, phenylalkyl with one to three carbon atoms in the alkyl part, methylsulphonyl or chlorine, these being in each case in the 5-position, or methoxy, phenoxy or phenyl, these being in each case in the 5-position or 6-position, and $Z_7$ denotes hydrogen or alkyl with one to four carbon atoms present in the 6- or 7-position or $Z_6$ and $Z_7$ denote a benzene or tetramethylene radical fused in the 4- and 5-position.

5. An azole compound as defined in claim 1 having the formula

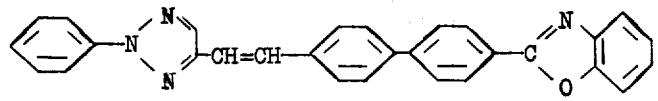  34

6. An azole compound as defined in claim 1 having the formula

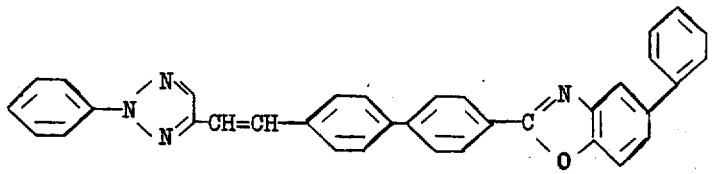  31

7. An azole compound as defined in claim 1 having the formula

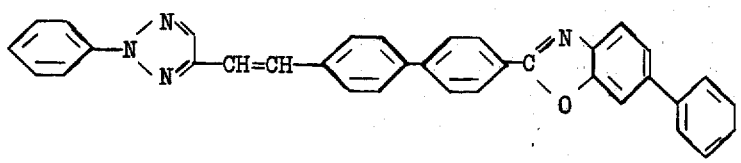  30

8. An azole compound as defined in claim 1 having the formula

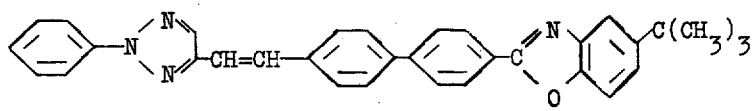  33

* * * * *

UNITED STATES PATENT AND TRADEMARK OFFICE
CERTIFICATE OF CORRECTION

PATENT NO. : 3,901,883
DATED : August 26, 1975
INVENTOR(S) : Liechti et al.

It is certified that error appears in the above—identified patent and that said Letters Patent are hereby corrected as shown below:

Claim 4, column 36, line 9 after "$Z_6$ and $Z_7$" insert

-- together --.

Signed and Sealed this second Day of December 1975

[SEAL]

Attest:

RUTH C. MASON
Attesting Officer

C. MARSHALL DANN
Commissioner of Patents and Trademarks